United States Patent [19]

Braid, deceased

[11] Patent Number: 4,551,259

[45] Date of Patent: Nov. 5, 1985

[54] PHENOLIC ANTIOXIDANTS AND LUBRICANTS CONTAINING SAME

[75] Inventor: Milton Braid, deceased, late of Haddonfield, N.J., by Gerassimos Frangatos, executor

[73] Assignee: Mobil Oil Corporation, New York, N.Y.

[21] Appl. No.: 561,411

[22] Filed: Dec. 14, 1983

[51] Int. Cl.[4] ............................................. C10M 1/38
[52] U.S. Cl. .................................. 252/48.2; 252/406; 568/23; 568/38; 568/52
[58] Field of Search ................. 252/48.2, 406; 568/23, 568/38, 52

[56] References Cited

U.S. PATENT DOCUMENTS

| | | | |
|---|---|---|---|
| 2,500,672 | 3/1950 | Garwood et al. | 568/38 X |
| 3,277,181 | 10/1966 | Hechenbielkner | 260/609 |
| 3,330,804 | 7/1967 | O'Shea | 252/48.2 X |
| 3,772,390 | 11/1973 | Song | 252/48.2 X |
| 4,305,832 | 12/1981 | Braid | 252/48.2 |
| 4,411,808 | 10/1983 | Guherrez et al. | 252/48.6 |
| 4,424,213 | 1/1984 | Magee et al. | 549/48 |

*Primary Examiner*—Jacqueline V. Howard
*Attorney, Agent, or Firm*—Alexander J. McKillop; Michael G. Gilman; Van D. Harrison, Jr.

[57] ABSTRACT

Reaction products obtained by reacting certain hindered phenols with selected thiaalkene provide antioxidant properties when added to lubricants.

20 Claims, No Drawings

PHENOLIC ANTIOXIDANTS AND LUBRICANTS CONTAINING SAME

BACKGROUND OF THE INVENTION

1. Field of the Invention

The invention relates to antioxidants and to lubricant compositions containing them. The antioxidants more particularly are hemi-hindered phenols containing a thiaalkene group in the ring.

2. Discussion of the Prior Art

It is well known that many organic liquids and solids used in industrial applications, such as oils and greases, power transmission fluids, resin and polymer coatings, insulations, structural products and the like, may deteriorate and lose their ability to function when subjected to oxidation. Since these substances are very often utilized at high temperatures, the rate of oxidation breakdown can be very rapid. This problem is particularly important in the operation of modern day automotive and aircraft engines. The breakdown of the lubricating oil, either natural or synthetic, is frequently accompanied by the formation of corrosive acids, sludge and other products of such breakdown. These resulting products can harm the metal surfaces of the engine and interfere with the efficient operation of the lubricants.

Phenols and alkylated phenols, particularly the hindered phenols, are well known agents for imparting oxidation protection to a wide variety of materials. For application to lubricants, fats and oils, and oil-containing food stuffs certain types of alkylated phenols known in the art as "hindered phenols" have been found to be particularly effective. For example 2,6-di-tert-butylphenol and 2,6-di-tert-4-methylphenol (known as BHT in foods and DBPC in lubricants) are widely utilized in such applications.

SUMMARY OF THE INVENTION

In accordance with this invention, there are provided product of reaction made by reacting under catalytic conditions, a hindered phenol of the formula:

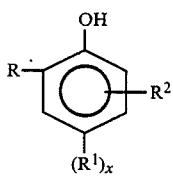

wherein R and $R^1$ are branched alkyl groups containing 3 to 16 carbon atoms, cycloalkyl groups containing 5 to 10 carbon atoms, aryl groups or alkyl-substituted aryl groups, wherein the alkyl portion contains 1 to 16 atoms and the aryl portion contains 6 to 14 carbon atoms, $R^2$ is hydrogen or a R group and x is 0 or 1 with a thiaalkene of the formula $$R^3(S)_yR^4$$

wherein $R^3$ and $R^4$ are individually unsaturated hydrocarbyl groups containing 3 to 20 carbon atoms and y is 1, 2 or 3. $R^3$ and $R^4$ may individually be alkylene, cycloalkylene or alkyl-branched alkylene and may be allyl, cycloalkenyl or alkyl-substituted allyl.

It will be understood that $R^1$ ord $R^2$ can occur at any position on the phenol ring. Further, it will be understood that the reaction of the thiaalkene takes place at an unsubstituted position (i.e., reacts with a hydrogen atom on the ring). These reaction possibilities can lead to compounds of the types shown in I, II, III and IV below, that is, to

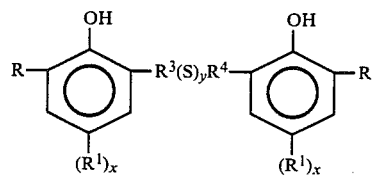

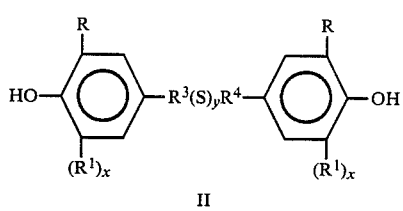

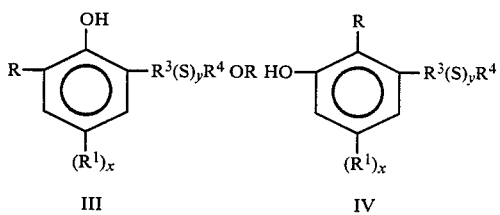

and mixtures thereof.

For this reason, i.e., the complex nature of the product, it will be referred to hereinafter in the specification as a product of reaction or similarly.

Other phenols useful in this invention are 2,4-dicyclohexyl-phenol, 2,3,4-tri-t-butylphenol, 2,4-di-t-octylphenol, 2-t-butyl-4-t-octylphenol, 3,8-di-t-butyl-2-naphthol and 4,6-di-t-octyl-1-naphthol.

DESCRIPTION OF SPECIFIC EMBODIMENTS

It has been found that hemi-hindered phenols, i.e. precursors of hindered phenols having one bulky alkyl substituent in the ring position adjacent to the hydroxyl, or hindered phenols which still have a reactive ring position available, produce, when alkylated with thio-bis- or dithiobis- alkenes, novel hindered phenol antioxidants which are unusually effective in protecting oils of lubricating viscosities against oxidative degradation.

While it is not a certainty, it is believed that the surprising potency of these new lubricant stabilizers can be attributed to the internal synergism or activity enhancement derived from the presence of peroxide-decomposing sulfide and disulfide centers and oxidation-chain propagation terminating phenol functions in the same molecule.

It has been further found that the reactant phenols need not be totally converted to the hindered phenol derivatives in order to provide a valuable and substantial degree of oxidation protection to lubricant compositions.

In general, methods for reacting a hindered phenol with a thiaalkene are known. The products of this invention may be made, for example, by reacting from 0.5 to 2 moles of the alkene with one mole of phenol at from about 50° C. to about 200° C. (preferably 50° to 100° C.) for from 1 to 8 hours in the presence of a catalyst. These catalysts may be selected from a variety of suitable materials, including 2-toluenesulfonic acid, trifluoromethanesulfonic acid and the boron halides, such as boron trifluoride and boron trifluoride complexes with alcohols or phenols. Solid catalysts such as a resin sulfonic acid or an acidic zeolite can also be used. It is understood that reaction times will depend upon reaction temperatures and that the higher the reaction temperature, the less reaction time required for completion of the reaction. While this work was carried out in a batch process it is anticipated that reactions using solid catalysts (e.g., zeolites or resin sulfonic acids) could readily be carried out in continuous processes wherein reactants are continuously fed through over a bed of catalyst at a space velocity, temperature and pressure which will allow high conversions to product. Solvents may be used and include hexane, pentane and ether.

In the above formulae R and $R^1$ may be isopropyl, t-butyl, 2-phenethyl t-amyl or cyclohexyl. It will be understood that the covered phenolic compounds embrace any member containing these named groups in any combination.

The thiaalkene reactant includes such compounds as:

paraffinic and naphthenic oils, mineral oils, and mixtures thereof, employed as the lubricating oil or grease vehicle, may be of an suitable lubricating viscosity range. For example, they may range in viscosities of from about 45 SSU at 100° to about 6000 SSU at 100° F., and preferably, from about 50 to about 250 SSU at 210° F. These oils may have viscosity indexes ranging to about 100 or higher. Viscosity indexes from about 70 to about 95 are preferred. The average molecular weights of these oils may range from about 250 to about 800.

In instances where synthetic oils, or combinations thereof, with mineral oils are preferred, various compounds of this type may be successfully utilized. Typical synthetic vehicles including polyisobutylene, polybutenes, hydrogenated polyolefins, polypropylene glycol, trimethylol propane esters, neopentyl and pentaerythritol esters, di(2-ethylhexyl) sebacate, di(2-ethylhexyl) adipate, dibutyl phthalate, fluorocarbons, silicate esters, silanes, esters of phosphorus-containing acids, liquid ureas, ferrocene derivatives, hydrogented mineral oils, chain-type polyphenyls, siloxanes and silicones (polysiloxanes), alkyl-substituted diphenyl ethers typified by a butyl-substituted bis(p-phenoxy phenol) ether, phenoxy phenylethers. It is to be understood, however,

| FORMULA | NAME |
|---|---|
| $CH_2=C(CH_3)-S-S-C(CH_3)=CH_2$ | 2,5-dimethyl-3,4-dithia-1,5-hexadiene |
| $CH_2=C(CH_3)(CH_2)_2-S-(CH_2)_2C(CH_3)=CH_2$ | 2,8-dimethyl-5-thia-1,8-nonadiene |
| $CH_2=C(CH_3)(CH_2)_2-S-S-CH_2-CH(CH_3)-CH=CH_2$ | 2,8-dimethyl-5,6-dithia-1,8-decadiene |
| $CH_2=C(CH_3)-CH_2-S-S-CH_2-C(CH_3)=CH_2$ | 2,7-dimethyl-4,5-dithia-1,7-octadiene (or methallyl disulfide) |
| $CH_2=C(CH_3)-CH_2-S-S-S-CH_2-C(CH_3)=CH_2$ | 2,8-dimethyl-4,5,6-trithia-1,8-octadiene |
| $CH_2=CH-CH_2-S-CH_2CH=CH_2$ | 4-thia-1,6-heptadiene (or allyl sulfide) |
| (bis-2-methylcyclohexenyl structure) | bis-2-methylcyclohexenylsulfide |
| $CH_2=CH-CH_2-S-S-CH_2CH_2=CH_2$ | 4,5-dithia-1,7-octadiene |

Also included are mixtures of the above compounds and related derivatives based on diisobutylene and triisobutylene. These structures are often generated by reaction of an olefin such as isobutylene or diisobutylene with sulfur halides, followed by treatment of this adduct with sodum sulfide or sodium hydroxide. Such mixtures will contain structures similar to those described in the formulae, and include unsaturated oligomers which provide similar alkylating species.

The compounds of the present invention have the ability to improve the friction and oxidation properties of oleaginous materials such as lubricating media, which may comprise either a mineral oil or a synthetic oil or mixtures thereof or a grease therefrom. In general, that the compositions contemplated herein can also contain other materials. For example, detergents, dispersants, corrosion inhibitors, extreme pressure agents, viscosity index improvers, co-antioxidants, anti-wear agents and the like can be used, including metal phenates, metallic sulfonates, zinc phosphorodithioates, polymeric detergents and silicone deformants. The materials do not detract from the value of the compositions of this invention, but rather they serve to impart their customary properties to the particular compositions in which they are incorporated. In general, the reformed adducts of the present invention may be employed in any amount which is effective for imparting one or more of fuel use reduction.

With respect to the greases of the invention, a wide variety of thickening agents can be used to prepare them. Including among the useful thickening agents are alkali and alkaline earth metal soaps of fatty acids and fatty materials having from about 12 to about 30 carbon atoms per molecule. The metals are typified by sodium, lithium, calcium and barium. Fatty materials are illustrated by stearic acid, hydroxystearic acid, stearin, cottonseed oil acids, oleic acid, palmitric acid, myristic acid and hydrogented fish oils.

Other thickening agents include salt and salt-soap complexes as calcium stearate-acetate (U.S. Pat. No. 2,197,263), barium stearate (U.S. Pat. No. 2,564,561), calcium stearate-caprylate-acetate complexes (U.S. Pat. No. 2,999,065), calcium captylate-acetate (U.S. Pat. No. 2,999,066), and calcium salts and soaps of low-, intermediate- and high-molecular weight acids and of nut oil acids.

Another group of thickening agents comprising substituted ureas, phthalocyanines, indanthrene, pigments such as perylimides, pyromellitdiimides, and ammeline.

The preferred thickening gelling agents employed in the grease compositions are essentially hydrophobic clays. Such thickening agents can be prepared from clays which are initially hydrophilic in character, but which have been converted into a hydrophobic condition by the introduction of long chain hydrocarbon radicals into the surface of the clay particles; prior to their use as a component of a grease composition, as, for example, by being subjected to a preliminary treatment with an organic cationic surface active agent, such as an onium compound. Typical onium compounds are tetraalkylammonium chlorides, such as dimethyl dioctadecyl ammonium chloride, dimethyl dibenzyl ammonium chloride and mixtures thereof. This method of conversion being well known to those skilled in the art, is believed to require no further discussion, and does not form a part of the present invention. More specifically, the clays which are useful as starting materials in forming the thickening agents to be employed in the grease compositions, can comprise the naturally occurring chemically unmodified clays. These clays are crystalline complex silicates, the exact composition of which is not subject to precise description, since they vary widely from one natural source to another. These clays can be described as complex inorganic silicates such as aluminum silicates, magnesium silicates, barium silicates, and the like, containing, in addition to the silicate lattice, varying amounts of cation-exchangeable groups of such as sodium. Hydrophilic clays which are particularly useful for conversion to desired thickening agents include montmorillonite clays, such as bentonite, attapulgite, hectorite, illite, saponite, sepiolite, biotite, vermiculite, zeolite clays, and the like. The thickening agent is employed in an amount from about 0.5 to about 30, preferably from 3 percent to 15 percent by weight of the total grease composition.

The following Examples will illustrate the invention. It will be understood that they are illustrative only and are not meant to limit the scope of the invention.

EXAMPLE 1

2,6-Di-t-butylphenol (82.4 grams, 0.40 moles), 250 ml. of n-octane and 8.7 grams (0.06 moles) of methallyl disulfide were placed in a 500 ml. 3-necked flask fitted with stirrer, thermometer and condenser. Ten grams of boron trifluoride ethereate were added to the stirred reactants and the entire solution was heated at 110° to 125° C. for ten hours. The solution was cooled, washed with water and dried over anhydrous sodium sulfate. After filtration the n-octane was removed in a rotovac, leaving 84.9 grams of residue. Gas chromatography of a small sample showed the presence of unreacted 2,6-di-t-butylphenol and two reaction products of higher molecular weight. The unreacted phenol was separated by distillation at 95°–105° C. (0.05 mm pressure). An infrared spectrum and a gas chromatograph of the residue showed the presence of mono- and di-alkylation products.

EXAMPLE 2

2-t-Butyl-4-methylphenol (65.7 grams, 0.4 moles), 250 ml of n-octane and 14.2 grams (0.1 mole) of methallyl disulfide were stirred at room temperature while 10 grams of boron trifluoride etherate were added in fifteen minutes. The reactants were stirred and heated at 110°–120° C. for eleven hours. The cooled solution was washed with water to remove the catalyst and then dried over anhydrous sodium sulfate and filtered. The filtrate was stripped free of n-octane on a rotovac at 90° C. Gas chromatography and infrared spectroscopy showed the presence of mono- and di-alkylation product containing 8.38% sulfur.

EXAMPLE 3

A sample of sulfurized isobutylene was prepared by the procedure of U.S. Pat. No. 3,703,504. The average molecular weight of this product was determined to be 220 and the infrared spectrum showed the presence of terminal ($=CH_2$) methylene unsaturation. One hundred and ten grams of this product and 103 grams of 2,6-di-t-butylphenol in 300 ml of n-octane were stirred at room temperature while 15 grams of boron trifluoride etherate were added in fifteen minutes. The reactants were then stirred and heated ten hours at 110°–120° C. After they were cooled, the reactants were washed with water and dried and the solvent was removed therefrom in a rotovac at 90° C. for 10 minutes under vacuum. Gas chromatography and infrared spectroscopy indicated the presence of mono- and di-alkylation product with only traces of unreacted phenol.

EVALUATION OF THE COMPOUNDS

The products were evaluated for their oxidative stability in a 260 second solvent paraffinic neutral mineral oil. In most cases improvements in oxidative stability over the base oil were observed. In the test the sample lubricant is subjected to a stream of air which is bubbled through at the rate of 5 liters per hour at 325° F. for 40 hours. Present in the composition are samples of metals commonly used in engine construction, namely, iron, copper, aluminum and lead. See U.S. Pat. No. 3,682,980, incorporated herein by referece, for further details of the test. Improvement in viscosity index or neutralization number (or both) shows effective control. The results are shown in Table 1.

TABLE 1

| COMPOSITION TESTED | CONC. ADDITIVE % WT. | NN | KV, % | Pb LOSS, MG |
|---|---|---|---|---|
| Oil | None | 17.8 | 202 | 171.3 |
|  |  | 17.0 | 334 | 66.0 |
| Example 1 in | 1.0 | 7.1 | 55 | 0 |
| Oil | 0.5 | 7.6 | 27 | 0 |

TABLE 1-continued

| COMPOSITION TESTED | CONC. ADDITIVE % WT. | NN | KV, % | Pb LOSS, MG |
|---|---|---|---|---|
| | 0.25 | 7.6 | 36 | 1.4 |
| Example 2 in Oil | 2.0 | 3.5 | 29 | 0 |
| | 1.0 | 4.7 | 39 | 0 |
| | 0.5 | 4.9 | 47 | 0 |
| Example 3 in Oil | 1.0 | 2.8 | 20 | 0 |
| | 0.5 | 3.2 | 38 | 0 |
| | 0.25 | 3.2 | 45 | 0 |

I claim:

1. A product of reaction made by reacting, under catalytic conditions, a hindered phenol of the formula

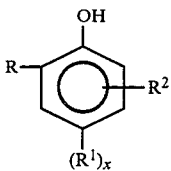

wherein R and $R^1$ are branched alkyl groups containing 3 to 16 carbon atoms, cycloalkyl groups containing 5 to 10 carbon atoms, aryl groups or alkyl-substituted aryl groups wherein the alkyl portion contains 1 to 16 carbon atoms, and the aryl portion contains 6 to 14 carbon atoms, $R^2$ is hydrogen or a R group and x is 0 or 1, with a thiaalkene of the formula $$R^3(S)_yR^4$$

wherein $R^3$ and $R^4$ are individually unsaturated hydrocarbyl groups containing 3 to 20 carbon atoms and y is 1 or 2.

2. The product of claim 1 wherein R and $R^1$ are individually selected from isopropyl, t-butyl, t-amyl, cyclohexyl and phenethyl group.

3. The product of claim 1 wherein $R^2$ is hydrogen.

4. The product of claim 1 wherein $R^3$ and $R^4$ are alkylene, cycloalkylene or alkyl-substituted alkylene.

5. The product of claim 4 wherein the thiaalkene is 2,5-dimethyl-3,4-dithia-1,5-hexadiene, 2,8-dimethyl-5-thia-1,8-nonadiene, 2,8-dimethyl-5,6-dithia-1,8-decadiene, 2,7-dimethyl-4,5-dithia-1,7-octadiene, 2,8-dimethyl-4,5,6-trithia-1,8-octadiene, 4-thia-1,6-heptadiene, bis-2-methylcyclohexenylsulfide and 4,5-dithia-1,7-octadiene.

6. The product of claim 1 wherein the catalyst is toluenesulfonic acid, trifluoromethanesulfonic acid, boron trifluoride or boron trifluoride complexed with alcohols or phenols.

7. The product of claim 1 wherein the phenol is 2,6-di-t-butyl-phenol and the thiaalkene is methallyl disulfide.

8. The product of claim 1 wherein the phenol is 2,6-di-t-butylphenol and the thiaalkene is sulfurized isobutylene.

9. A lubricant composition comprising a major proportion of a lubricant selected from the group consisting of (1) a mineral oil, (2) a synthetic oil or a mixture of synthetic oils, (3) a mixture of (1) and (2) or (4) a grease from any of the foregoing, and an antioxidant amount of a product of reaction made by reacting, under catalytic conditions, a hindered phenol of the formula

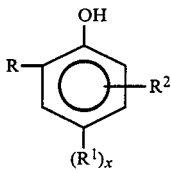

wherein R and $R^1$ are a branched alkyl group containing 3 to 16 carbon atoms, cycloalkyl groups containing 5 to 10 carbon atoms, aryl groups or alkyl-substituted aryl groups wherein the alkyl portion contains 1 to 16 carbon atoms, and the aryl portion contains 6 to 14 carbon atoms, $R^2$ is hydrogen or a R group and x is 0 or 1, with a thiaalkene of the formula $$R^3(S)_yR^4$$

wherein $R^3$ and $R^4$ are individually unsaturated hydrocarbyl groups containing 3 to 20 carbon atoms and y is 1 or 2.

10. The composition of claim 9 wherein R and $R^1$ are individually selected from isopropyl, t-butyl, t-amyl, cyclohexyl and phenethyl group.

11. The composition of claim 9 wherein $R^2$ is hydrogen.

12. The composition of claim 9 wherein $R^3$ and $R^4$ are alkylene, cycloalkylene or alkyl-substituted alkylene.

13. The composition of claim 12 wherein the thiaalkene is 2,5-dimethyl-3,4-dithia-1,5-hexadiene, 2,8-dimethyl-5-thia-1,8-nonadiene, 2,8-dimethyl-5,6-dithia-1,8-decadiene, 2,7-dimethyl-4,5-dithia-1,7-octadiene, 2,8-dimethyl-4,5,6-trithia-1,8-octadiene, 4-thia-1,6-heptadiene, bis-2-methylcyclohexenylsulfide and 4,5-dithia-1,7-octadiene.

14. The composition of claim 9 wherein the catalyst is toluenesulfonic acid, trifluoromethanesulfonic acid, boron trifluoride or boron trifluoride complexed with alcohols or phenols.

15. The composition of claim 9 wherein the phenol is 2,6-di-t-butyl-phenol and the thiaalkene is methallyl disulfide.

16. The composition of claim 9 wherein the phenol is 2,6-di-t-butylphenol and the thiaalkene is sulfurized isobutylene.

17. The composition of claim 9 wherein the lubricant is a mineral lubricating oil.

18. The composition of claim 9 wherein the lubricant is a synthetic oil or mixture of synthetic oils.

19. The composition of claim 9 wherein the lubricant is the mixture of (3).

20. The composition of claim 9 wherein the lubricant is a grease of (1), (2) or (3).

* * * * *